United States Patent [19]

Einhaus

[11] Patent Number: 4,682,319
[45] Date of Patent: Jul. 21, 1987

[54] PIVOTING FRONT COVER FOR A DRAWER

[75] Inventor: Hermanus F. Einhaus, Eindhoven, Netherlands

[73] Assignee: U.S. Philips Corporation, New York, N.Y.

[21] Appl. No.: 784,915

[22] Filed: Oct. 4, 1985

[30] Foreign Application Priority Data

Oct. 12, 1984 [NL] Netherlands .......................... 8403117

[51] Int. Cl.4 ........................ G11B 17/04; A47B 81/06
[52] U.S. Cl. ...................................... 369/75.2; 312/8; 369/75.1
[58] Field of Search ................... 369/75.1, 75.2; 312/8, 312/284, 323

[56] References Cited

U.S. PATENT DOCUMENTS

| 4,530,081 | 7/1985 | Sakurai et al. | 369/75.2 |
| 4,539,669 | 9/1985 | Miyakawa et al. | 369/75.2 |
| 4,600,247 | 7/1986 | Einhaus | 312/8 |

FOREIGN PATENT DOCUMENTS 822174 12/1937 France ............................... 369/75.2

Primary Examiner—Steven L. Stephan
Attorney, Agent, or Firm—David R. Treacy

[57] ABSTRACT

A housing has a front opening through which a drawer is movable outwardly, and a pivotal front cover covering a portion of the opening above the drawer. Movement of the drawer pivots the cover from an open to a closed position, in the open position the cover being out of the way, close to a top wall of the housing. The cover rests on edges of a side portion extending from the front portion of the cover and engaging a guide edge on the drawer. A control lever, pivoted on a side wall of the housing, and having an end pivotally connected to the cover side portion, and has a short arm which is engaged by projections on the drawer to pivot the lever as the drawer is moved, and thus pivot the front cover.

20 Claims, 5 Drawing Figures

PIVOTING FRONT COVER FOR A DRAWER

BACKGROUND OF THE INVENTION

The invention relates to an apparatus having a sliding drawer, such as a phonograph; and more particularly to an apparatus having an opening at the front of a housing through which a drawer is rectilinearly slidable in an outward direction and an inward direction relative to the housing. Front cover, which is pivotable relative to the housing between an open position and a closed position, is mounted above the drawer. The pivotal movement of the front cover during the sliding movement of the drawer is controlled by a control device on the drawer.

In a known record player using this construction, the drawer carries a turntable and the front cover is mounted for pivotal movement about pivots which are connected to the housing. The pivotal movement of the front cover towards the open position can be effected over a limited distance only, so that in the open position the front cover still projects partly from the housing. This partly projecting front cover may obstruct the placing of a record on or its removal from the turntable.

SUMMARY OF THE INVENTION

The object of the invention is to enable opening a cover of an apparatus of the types described above, to a fully open or closed position by simple yet compact mechanism.

According to the invention the front cover comprises at least one side portion which extends rearwards from the front of the cover along the inner side of an adjacent side wall of the housing, and bears on a guide edge of the drawer in the open position and in the closed position of the cover. The control device on the drawer includes an actuating projection and a reset projection which are situated near this housing side wall. The actuating projection adjoins a positioning edge of the control mechanism. During the outward movement and the inward movement of the drawer, the actuating projection and the reset projection cooperate with a control element connected to this side portion of the front cover, and the inward movement to cause the front cover to be pivoted to the open position and the closed position respectively, the front cover being retained in the open position by the cooperation of the control element with the positioning edge. In this way an apparatus, such as a record player, comprising a drawer can be provided with a front cover which is actuated by members situated on the drawer near the side wall of the housing.

As a result of this construction, a comparatively large space for the other parts of the apparatus is available between this side wall and the opposite side wall. An apparatus in accordance with the invention can then have a comparatively small width, which is desirable in modern equipment. As the movement of the side portion of the front cover is controlled by means of the actuating projection and the reset projection, the front cover can be tilted between the open position and the closed position on the guide edge on the drawer in synchronism with the sliding movement of the drawer, in such a way that the cover is situated wholly inside the housing when it is in the open position. The control mechanism enable the front cover to be controlled in a simple and cheap manner.

A preferred embodiment of the invention is characterized in that relative to the front of the drawer the reset projection is situated forwardly of the actuating projection and the adjoining positioning edge which extends in a rearward direction from the actuating projection, and relative to the bottom of the housing the reset projection is situated at a higher level than the actuating projection and the positioning edge. With this arrangement, when the drawer is slid inwards the front cover is pivoted back by engagement of the reset projection with the control element. Preferably, the reset projection and the actuating projection as well as the positioning edge are injection-molded integrally with the drawer from a synthetic material, so that these parts can be positioned accurately relative to one another.

Preferably the control element is constituted by a two-armed control lever which is pivotally mounted on the side wall of the housing. The the side portion of the front cover at the end of a first arm of the lever. The reset and actuating projections engage the free end of a second arm of the lever. The use of a control lever provides an optimum control for the pivotal movement of the front cover and has the advantage that in the open position the front cover can be tilted effectively into the housing by means of the control lever.

In this preferred embodiment of the invention the length of the first arm of the control lever is greater than the length of the second arm. Thus, the control lever can also move the front cover inwards over some distance relative to the front of the housing during the pivotal movement of the cover to the open position. This ensures that in the open position the front cover can be situated wholly inside the housing.

In this preferred embodiment, viewed perpendicularly to the direction of movement of the drawer, the side portion of the front cover has a curved edge extending between a first straight edge and a second straight edge in such a way that the open position of the front cover the first straight edge rests on the guide edge of the drawer; in the closed position of the cover the second straight edge rests on the guide edge; and during the pivotal movement of the cover between the open position and the closed position of the cover the curved edge of the side portion rolls on the guide edge. In this respect it is advantageous that, as a result of the rolling movement of the curved edge, on the guide edge the front cover performs a simple and smooth pivotal movement. This enables the front cover to close the housing completely in the open position and to be tilted freely into the open position without rubbing against any parts of the housing.

To achieve the movements described above it is advantageous if viewed perpendicularly to the direction of movement of the drawer the side portion of the front cover has a substantially rhombic shape, the end of the first arm of the control lever being pivotally connected to the side portion of the cover near that end of the second straight edge which is remote from the first straight edge.

The invention will be described in more detail, by way of example, with reference to the accompanying drawings.

DESCRIPTION OF THE PREFERRED EMBODIMENT

Figure 1:
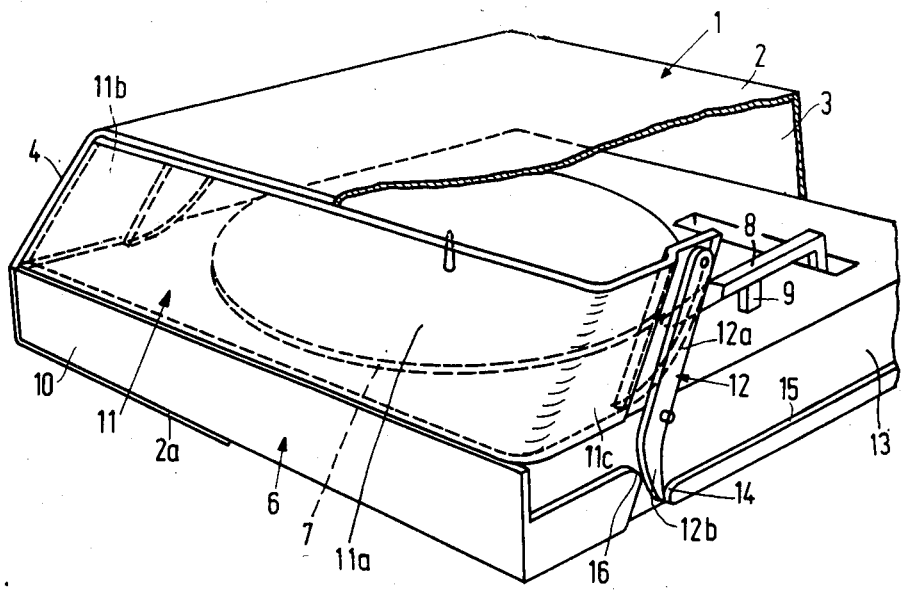
FIG. 1 is a perspective view of an apparatus in accordance with the invention, partly broken away, showing the front cover in the closed position.
Figure 2:
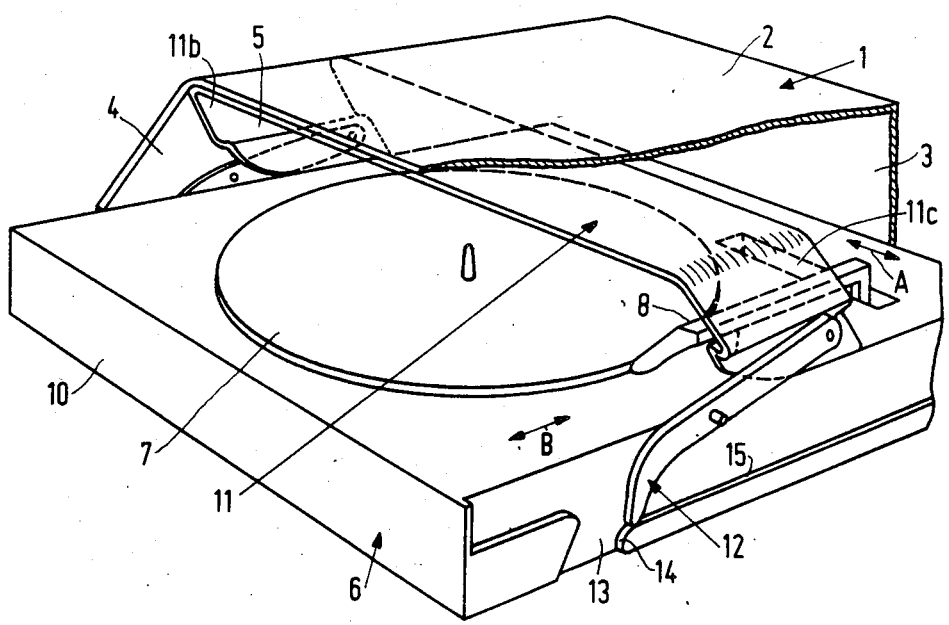
FIG. 2 is a perspective view of the apparatus of FIG. 1, again partly broken away, showing the front cover in the open position.

The apparatus in the form of a record player shown in FIGS. 1 and 2 comprises a housing 1 having an upper wall 2, a rear wall 3 and two side walls 4, of which only the left-hand side wall is shown in FIGS. 1 and 2. The housing further has a bottom wall 2a only part of which is shown. Thus, the housing 1 is entirely closed except for the front which is left open to form a front opening 5 in the housing. A drawer 6 is arranged in the lower part of the housing and carries a turntable 7 which is rotatably supported in the drawer 6 and which is driven by a motor, not shown. The drawer 6 also carries a pickup arm 8, which extends tangentially of the turntable 7 and is guided in the drawer 6 so as to be movable in the directions indicated by the double arrow A. In the rest position the pick up arm 8 rests on a support 9 near the right-hand side wall 4, the upper side of the turntable 7 being entirely free to enable a record to be placed on the turntable after the drawer 6 has been slid out.

Figure 3A:
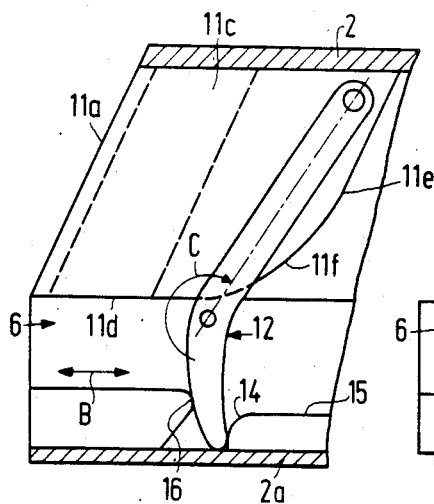
FIGS. 3a, 3b and 3c are sectional views of a part of the apparatus shown in FIG. 1, with the front cover in a closed, a partly open and a fully open position respectively.
Figure 3B:
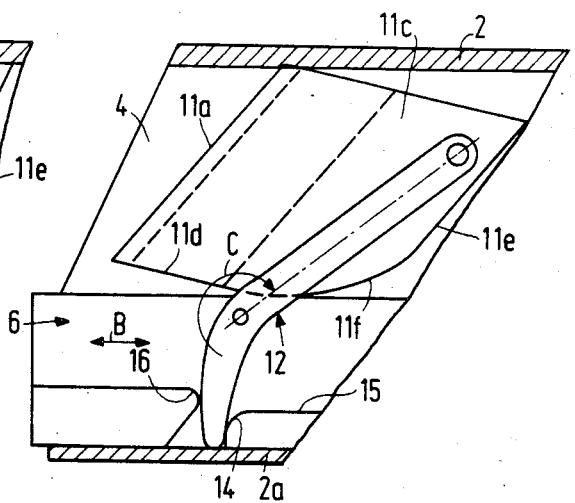

In the closed position a front wall 10 of the drawer covers the lower part of the front opening 5 of the housing and the part of the front opening above the front wall 10 is closed by a front cover 11, which is preferably made of a transparent plastics material. As is shown in FIG. 3a, the front cover 11 comprises a main portion 11a which extends obliquely upwards between the front wall 10 of the drawer 6 and the upper wall 2 of the housing 1. The front cover 11 further comprises side portions 11b, 11c which are situated adjacent the side walls 4 of the housing 1. The side portions 11b and 11c are mirror images of one another, so only the side portion 11c and the parts of the record player which cooperate therewith will be described. Near the end which is remote from the main portion 11a of the front cover, the side portion 11c comprises a portion which is offset in the inward direction relative to the remainder of the side portion. Viewed from the side, as in FIG. 3, the side portion 11c has a substantially rhombic shape. Between a first straight edge 11d and a second straight edge 11e, a convexly curved edge 11f is formed on the side portion.

Near the end of the cover edge 11e which is remote from the edge 11d, the side portion 11c is pivotally connected to a control element 12, constituted by a two-armed control lever. The control lever 12 is pivotally mounted on the adjacent side wall 4 of the housing. The pivotal axis of this mounting and the pivotal axis of the connection between the control lever and the side portion 11c of the front cover extend substantially perpendicularly to the side wall 4. The control lever 12 has a first arm 12a, which is pivotally connected to the side portion 11c at the end of the arm 12a which is remote from the pivotal mounting of the lever; and a second arm 12b, which at its free end is cooperable, in a manner to be described hereinafter, with control means provided on an adjacent upright side wall 13 of the drawer 6. It is to be noted that the length of the first arm 12a measured between the fulcrum of the lever 12, i.e., its pivotal mounting and the articulated end of the arm 12a, i.e. the end which is pivotally connected to the side portion 11c of the front cover, is greater than the length of the second arm 12b measured between the fulcrum and the free end of this arm. In this embodiment the ratio between the lengths of the two arms is approximately 1:2. In the present embodiment the second arm extends at an angle of approximately 150° to the first arm.

Each side wall 13 of the drawer 6 carries the control means for the adjacent control lever, the control means comprising an actuating projection 14 and an adjoining positioning edge 15. The edge 15 extends in a rearward direction from the projection 14, substantially parallel to the direction of movement of the drawer as indicated by the double arrow B. The control means further comprise a reset projection 16. These two projections and the positioning edge are located close to the adjacent side wall 4 of the housing, and during the outward and inward movements of the drawer they cooperate with a portion of the second arm 12b of the control lever 12 at the free end of the arm 12b. Relative to the front of the drawer 6 the reset projection 16 is situated forwardly of the actuating projection 14 and the adjoining positioning edge 15. Relative to the bottom wall 2a of the housing the reset projection 16 is situated at a higher lever than the actuating projection 14 and the positioning edge 15. The end portion of the second arm 12b of the control lever is movable in the gap between the actuating projection and the reset projection.

As shown in FIG. 1, in the rest position of the record player the drawer 6 is fully retracted into the housing 1 and the front cover 11 is closed. The first straight edge 11d of each side portion of the front cover then rests on a guide edge of the drawer 6. The construction of the front cover 11 is such that it extends obliquely forwardly and downwardly from a front edge of the upper wall 2, to the top surface of the drawer 6, and closes the part of of the front opening 5 of the housing 1 above the drawer 6 completely. Upon depression of an actuating button, not shown, a drive mechanism, not shown, is started, so that the drawer is moved outwards. During this outward movement the control means on the side walls 13 of the drawer cause the front cover to be moved gradually from the closed position shown in FIG. 1 to the open position shown in FIG. 2 via the intermediate positions shown in FIGS. 3a, 3b and 3c in the following manner.

Immediately after the outward movement of the drawer 6 has begun, as is shown in FIG. 3a, the actuating projection 14 of the control means 14, 15, 16 on each side wall 13 of the drawer displaces the free end of the second arm 12b of the adjacent control lever 12, causing this lever to pivot about its fulcrum in the direction indicated by the arrow C. In this pivotal movement the first arm 12a of the control lever acts on the adjacent side portion 11b or 11c of the front cover 11 in a rearward and downward direction to tilt this side portion, the curved edge 11f of the side portion rolling on the respective guide edge of the drawer 6. This is shown for the side portion 11c in FIG. 3b. The rhombic shape of the side portions 11b and 11c is advantageous because this enables the side portions and the other portions of the front cover to be tilted freely in the space between the upper side of the drawer and the upper wall 2 of the housing 1 without the risk of the front cover becoming jammed in this space.

Figure 3C:
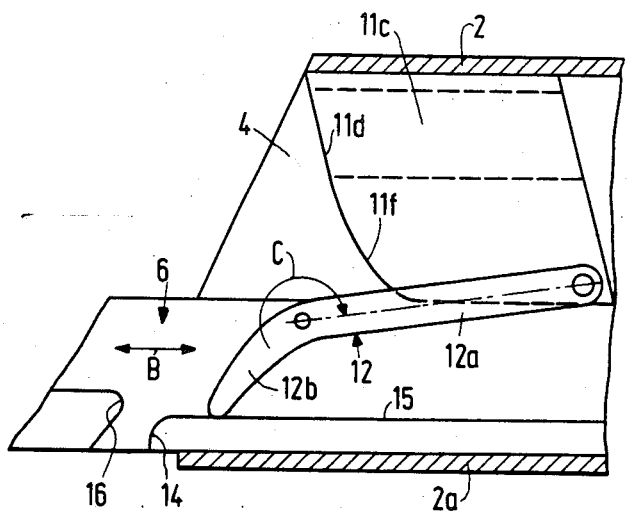

Further, it is advantageous that the first arm 12a of each control lever 12 has a greater length than the second arm 12b. In this way the front cover is moved backwards effectively. Thus when the actuating projection 14 of each control means has passed the free end of the second arm 12b of the associated control lever 12, this end of the arm 12b will rest on the positioning edge 15 ensuring a stable position of the front cover when the position shown in FIG. 3c is reached. In this position the second straight edge 11e of each side portion of the front cover bears on the associated guide edge of the drawer. In this position the front cover is situated wholly inside the housing 1 and a record can readily be placed on the turntable 7. Also, in this position the pick-up arm 8 can be situated at a comparatively short distance from the adjacent side wall 4 of the housing, because the side portion 11c of the front cover and the control lever 12 have comparatively small dimensions viewed in the direction in which this distance is measured, namely, the direction indicated by the double arrow A. This is very advantageous when the record player in accordance with the invention is used in audio systems in which the record player should have a small width. Thus, the record player in accordance with the invention, when it is adapted to play records of 30 cm diameter, can have an overall width of only 32 cm.

When the actuating button is actuated again the drawer 6 is moved inwards. During this movement the face end of the second arm 12b of each control lever 12 leaves the positioning edge 15 on the adjacent side wall 13 of the drawer 6 and abuts the reset projection 16 on this wall, which is situated at a higher level than the positioning edge 15. The free end of the lever arm 12b is then deflected downwardly by the reset projection 16 so that the end portion of the arm 12b moves in the gap between the reset projection 16 and the associated actuating projection 14 as in FIG. 3b to cause a pivotal movement of the respective control lever 12 in the direction opposite to that indicated by the arrow C so that the front cover is tilted back from the open position to the closed position shown in FIG. 3a.

Apart from the advantages of a small external width and the effective pivotal movement of the front cover 11, another advantage is that the front cover 11 is automatically controlled in its movements towards the closed and open positions by the inward and outward movements of the drawer. A further advantage is that the present construction permits the use of a synthetic material and a small number of parts. Thus, the record player in accordance with the invention provides a maximum ease of operation and yet can be manufactured simply and cheaply.

It is to be noted that instead of two control levers 12 it is possible to use only one control lever. Moreover, instead of being inclined the main portion 11a of the front cover 11 may extend perpendicularly to the upper wall 2 of the housing. In the latter case the front of the housing 1 between the top and bottom can be entirely flat. Finally, it is to be noted that in the latter case the or each control element 12 may be constructed as an arm which is rigidly connected to the or the respective side portion of the front cover 11.

The apparatus in accordance with the invention may be a record player for playing conventional audio records, as described herein, but alternatively it may be a player of the kind for playing optically readable records such as "Compact Disc" records. Further, in a manner not shown, the apparatus may be constructed as a magnetic-tape apparatus for recording and/or reproducing audio and/or video signals, in which case the drawer 6 carries a tape-deck mechanism.

What is claimed is:

1. An apparatus having a front closure for space above an extendable drawer, to provide ready access to a top surface of the drawer, comprising
   a housing having a front opening and a side wall,
   a drawer, rectilinearly slidable in outward and inward directions with respect to said housing, through said opening,
   a front cover for covering a portion of the opening above the drawer, pivotable relative to said housing between open and closed positions, and
   control means on the drawer for controlling pivotal movement of the cover during sliding movement of the drawer,
   characterized in that said apparatus comprises a control element connected to said housing side wall,
   said drawer has a guide edge extending generally in the directions of slidable rectilinear movement of said drawer,
   said control means comprise an actuating projection and a reset projection on said drawer, each disposed adjacent said housing side wall,
   said front cover comprises a front portion, and at least one side portion extending rearwardly from the front portion and articulated to said control element, said side portion having at least two bearing edges arranged such that in said closed position one of said bearing edges bears on said guide edge, and in said open position another of said bearing edges bears on said guide edge, and
   said element, projections and edges are arranged such that during outward movement said actuating projection engages said control element to pivot said cover to the open position, and during inward movement said reset projection engages said control element to pivot said cover to the closed position.

2. An apparatus as claimed in claim 1, characterized in that said drawer comprises a positioning edge, said actuating projection adjoining said positioning edge; and said positioning edge is arranged such that, when the drawer is moved outwardly to a fully extended position said control element engages said positioning edge to maintain the cover fully open.

3. An apparatus as claimed in claim 2, characterized in that said housing includes an upper wall having a front edge, said upper wall extending from said front edge parallel to the direction of inward drawer movement,
   in its closed position said front cover front portion extends obliquely outwardly from said front edge to said drawer,
   said guide edge extends parallel to the directions of drawer movement, and
   in the open position said cover front portion is parallel to and adjacent said upper wall, whereby in the open position the front cover does not obstruct access to an interior space above said drawer.

4. An apparatus as claimed in claim 3, characterized in that said reset projection is disposed outwardly of said actuating projection,
   said positioning edge extends inwardly from said actuating projection, and said actuating projection and positioning edge are spaced farther from said guide edge than said reset projection.

5. An apparatus as claimed in claim 4, characterized in that said actuating projection and reset projection are spaced from each other in the direction of drawer movement, and said control element has an end portion which moves in the space between said actuating and reset projections during pivotal movement of the front cover.

6. An apparatus as claimed in claim 5, characterized in that said control element is a lever pivotally mounted on said housing side wall, and articulated to the side portion of the front cover at an end of a lever first arm, said lever having a second arm having a free end arranged for engaging said control means, said lever first arm having a length greater than the length of the second arm.

7. An apparatus as claimed in claim 6, characterized in that said guide edge is a straight edge, and said side portion of the front cover has first and second straight edges and a curved edge extending between said first and second straight edges, in the open position said first straight edge rests on said guide edge, in the closed position said second straight edge rests on said guide edge, and during pivotal movement of the cover between the open and closed positions said curved edge rolls on said guide edge.

8. An apparatus as claimed in claim 7, characterized in that said side portion of the front cover has a substantially rhombic shape, said cover front portion bounding a side of the rhombus opposite said first straight edge, and said end of the first arm of the control lever being pivotally connected to the cover side portion near an end of said second straight edge remote from the first straight edge.

9. An apparatus as claimed in claim 1, characterized in that said housing includes an upper wall having a front edge, said upper wall extending from said front edge parallel to the direction of inward drawer movement, in its closed position said front cover front portion extends obliquely outwardly from said front edge to said drawer, said guide edge extends parallel to the directions of drawer movement, and in the open position said cover front portion is parallel to and adjacent said upper wall, whereby in the open position the front cover does not obstruct access to an interior space above said drawer.

10. An apparatus as claimed in claim 9, characterized in that said guide edge is a straight edge, and said side portion of the front cover has first and second straight edges and a curved edge extending between said first and second straight edges, in the open position said first straight edge rests on said guide edge, in the closed position said second straight edge rests on said guide edge, and during pivotal movement of the cover between the open and closed positions said curved edge rolls on said guide edge.

11. An apparatus as claimed in claim 1, characterized in that said actuating projection and reset projection are spaced from each other in the direction of drawer movement, and said control element has an end portion which moves in the space between said actuating and reset projections during pivotal movement of the front cover.

12. An apparatus as claimed in claim 1, characterized in that said control element is a lever pivotally mounted on said housing side wall, and articulated to the side portion of the front cover at an end of a lever first arm, said lever having a second arm having a free end arranged for engaging said control means, said lever first arm having a length greater than the length of the second arm.

13. An apparatus as claimed in claim 1, characterized in that said guide edge is a straight edge, and said side portion of the front cover has first and second straight edges and a curved edge extending between said first and second straight edges, in the open position said first straight edge rests on said guide edge, in the closed position said second straight edge rests on said guide edge, and during pivotal movement of the cover between the open and closed positions said curved edge rolls on said guide edge.

14. An apparatus for recording and/or reproducing signals on a record medium which is placed into the apparatus through a front opening of the apparatus, comprising a housing having a front opening and a side wall, a drawer, rectilinearly slidable in outward and inward directions with respect to said housing, through said opening, and having a top surface and a device for recording and/or reproducing signals on a record medium, said device projecting above said top surface, a front cover for covering a portion of the opening above the drawer top surface, pivotable relative to said housing between open and closed positions, and control means on the drawer for controlling pivotal movement of the cover during sliding movement of the drawer, characterized in that said apparatus comprises a control element connected to said housing side wall, said drawer has a guide edge extending generally in the directions of slidable rectilinear movement, and a positioning edge, said control means comprise an actuating projection and a reset projection on said drawer, each disposed adjacent said housing side wall, said actuating projection adjoining said positioning edge, said front cover comprises a front portion, and at least one side portion extending rearwardly from the front portion and articulated to said control element, said side portion having at least two bearing edges arranged such that in said closed position one of said bearing edges bears on said guide edge, and in said open position another of said bearing edges bears on said guide edge, and said element, projections and edges are arranged such that during outward movement said actuating projection engages said control element to pivot said cover to the open position, and during inward movement said reset projection engages said control element to pivot said cover to the closed position, said positioning edge being arranged such that, when the drawer is moved outwardly to a fully extended position said control element engages the positioning edge to maintain the cover fully open.

15. An apparatus as claimed in claim 14, characterized in that said housing includes an upper wall having a front edge, said upper wall extending from said front edge parallel to the direction of inward drawer movement,
   in its closed position said front cover front portion extends obliquely outwardly from said front edge to said top surface of said drawer,
   said guide edge extends parallel to the direction of drawer movement, and
   in the open position said cover front portion is parallel to and adjacent said upper wall, whereby in the open position the front cover does not obstruct access to an interior space above said drawer.

16. An apparatus as claimed in claim 15, characterized in that said reset projection is disposed outwardly of said actuating projection,
   said positioning edge extends inwardly from said actuating projection,
   said actuating projection and positioning edge are spaced farther from said guide edge than said reset projection,
   said actuating projection and reset projection are spaced from each other in the direction of drawer movement, and
   said control element has an end portion which moves in the space between said actuating and reset projections during pivotal movement of the front cover.

17. An apparatus as claimed in claim 16, characterized in that said control element is a lever pivotally mounted on said housing side wall, and articulated to the side portion of the front cover at an end of a lever first arm, said lever having a second arm having a free end arranged for engaging said control means, said lever first arm having a length greater than the length of the second arm.

18. An apparatus as claimed in claim 17, characterized in that said guide edge is a straight edge, and said side portion of the front cover has first and second straight edges and a curved edge extending between said first and second straight edges,
   in the open position said first straight edge rests on said guide edge, in the closed position said second straight edge rests on said guide edge, and during pivotal movement of the cover between the open and closed positions said curved edge rolls on said guide edge.

19. An apparatus as claimed in claim 18, characterized in that said side portion of the front cover has a substantially rhombic shape, said cover front portion bounding a side of the rhombus opposite said first straight edge, and said end of the first arm of the control lever being pivotally connected to the cover side portion near an end of said second straight edge remote from the first straight edge.

20. An apparatus as claimed in claim 14, characterized in that said reset projection is disposed outwardly of said actuating projection,
   said positioning edge extends inwardly from said actuating projection,
   said actuating projection and positioning edge are spaced farther from said guide edge than said reset projection,
   said actuating projection and reset projection are spaced from each other in the direction of drawer movement,
   said control element has an end portion which moves in the space between said actuating and reset projections during pivotal movement of the front cover,
   said guide edge is a straight edge, and said side portion of the front cover has first and second staight edges and a curved edge extending between said first and second straight edges,
   in the open position said first straight edge rests on said guide edge, in the closed position said second straight edge rests on said guide edge, and during pivotal movement of the cover between the open and closed positions said curved edge rolls on said guide edge, and
   said side portion of the front cover has a substantially rhombic shape, said cover front portion bounding a side of the rhombus opposite said first straight edge, and said end of the first arm of the control lever being pivotally connected to the cover side portion near an end of said second straight edge remote from the first straight edge.

* * * * *